United States Patent
Wang

(10) Patent No.: US 9,115,807 B2
(45) Date of Patent: Aug. 25, 2015

(54) PISTON FOR AN AIR PUMP

(76) Inventor: Wei-Chi Wang, Tainan (TW)

(*) Notice: Subject to any disclaimer, the term of this patent is extended or adjusted under 35 U.S.C. 154(b) by 467 days.

(21) Appl. No.: 13/600,290

(22) Filed: Aug. 31, 2012

(65) Prior Publication Data

US 2014/0060320 A1    Mar. 6, 2014

(51) Int. Cl.
*F04B 53/12* (2006.01)
*F16J 1/09* (2006.01)
*F04B 39/00* (2006.01)
*F16J 1/12* (2006.01)

(52) U.S. Cl.
CPC .............. *F16J 1/09* (2013.01); *F04B 39/0016* (2013.01); *F04B 53/12* (2013.01); *F04B 53/127* (2013.01); *F16J 1/12* (2013.01)

(58) Field of Classification Search
CPC ............... F16J 1/09; F16J 1/12; F16J 1/008; F04B 53/127; F04B 53/12
USPC ............................................ 92/181 R, 181 P
See application file for complete search history.

(56) References Cited

U.S. PATENT DOCUMENTS

| 7,275,477 B1* | 10/2007 | Chen | 92/183 |
| 2004/0028545 A1* | 2/2004 | Wang | 417/550 |
| 2007/0264140 A1* | 11/2007 | Chou | 417/545 |
| 2011/0076164 A1* | 3/2011 | Chou | 417/321 |

* cited by examiner

*Primary Examiner* — Thomas E Lazo
(74) *Attorney, Agent, or Firm* — Charles E. Baxley

(57) ABSTRACT

A piston for an air pump has a connecting rod and a sealing valve. The connecting rod has a seat. The seat has a groove and a retaining surface. The groove is defined in an outer surface of the seat. The retaining surface is adjacent to the groove. The sealing valve movably engages the seat of the connecting rod and has an engaging ring and a sealing part. The engaging ring has an inwall which extends into the groove and has an engaging surface facing the retaining surface. The sealing part is connected with the inwall of the engaging ring and sealingly covers the through hole. The sealing valve is not prone to deformation and warpage during the operation of the piston to prevent any operating noise problem.

3 Claims, 5 Drawing Sheets

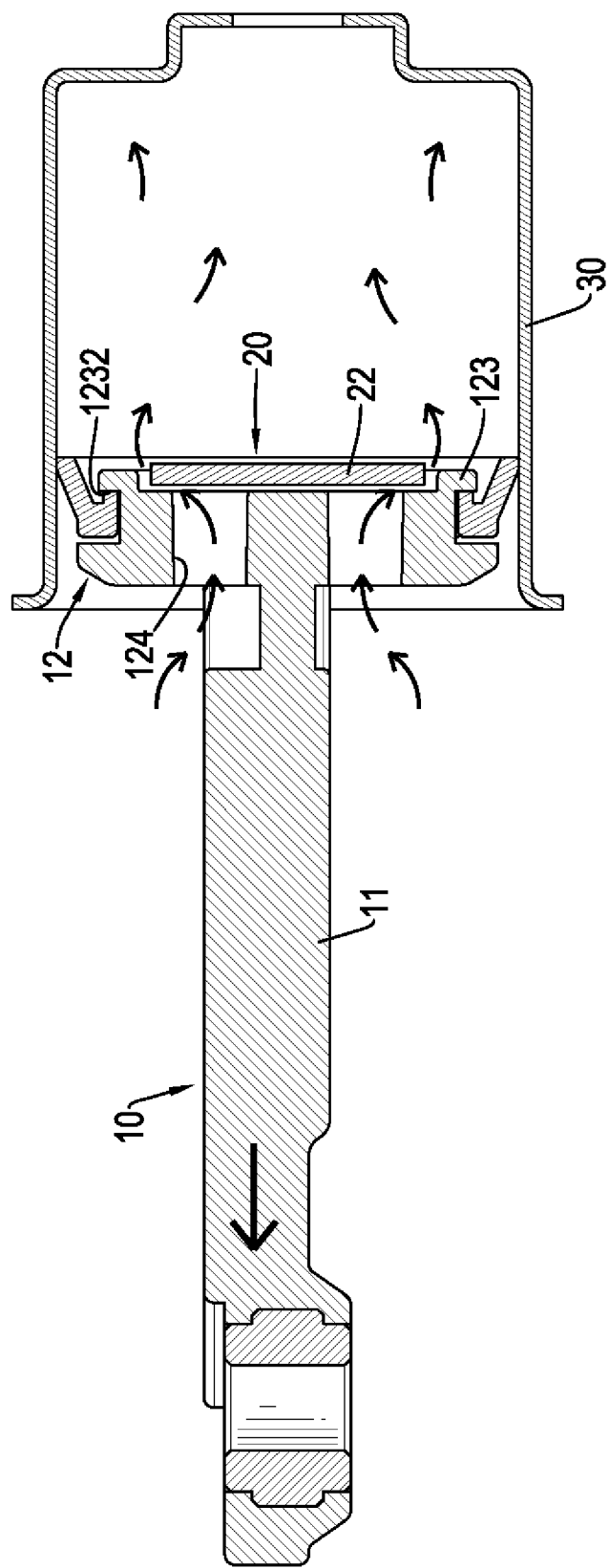

PISTON FOR AN AIR PUMP

BACKGROUND OF THE INVENTION

1. Field of the Invention

The invention relates to a piston for an air pump, and more particularly to a piston for an air pump to enhance the sealing effect, to prevent deformation of a valve and to reduce operating noise.

2. Description of Related Art

An air pump for inflating tires or airbeds generally comprises a motor, a piston cylinder and a piston. The piston reciprocates in the piston cylinder by operation of the motor, and the piston can compress the air in the piston cylinder to high pressure gas for inflation.

The piston has a piston seat and an elastic flap. The piston seat is mounted at a top end of the piston and has a through hole. The elastic flap is mounted on a top end of the piston seat and covers the through hole. When the piston is driven by the motor, the airflow impacts the elastic flap to lift the elastic flap from the through hole, and then the airflow flows through the through hole into the piston cylinder. When the piston is driven by the motor at the next time, and the airflow will be pushed to flow out the piston cylinder.

The conventional piston has the following disadvantages:

1. The elastic flap is mounted on the piston seat by a rivet, so the combination between the elastic flap and the piston seat is complex. Moreover, the elastic flap becomes warped and deformed when the air pump has been used for a period. Then, a gap is formed between the elastic flap and the piston seat or the elastic flap does not hermetically cover the through hole of the piston seat. Thus, the working efficiency of the piston is poor.

2. The elastic flap is metal and causes a noise when the elastic flap returns to cover the through hole of the piston seat.

3. The material cost of the elastic flap is high.

To overcome the shortcomings, the present invention provides a piston for an air pump to obviate the aforementioned problems.

SUMMARY OF THE INVENTION

An objective of the invention is to provide a piston for an air pump being easy to install, having a low cost and reducing operating noise.

The piston for an air pump has a connecting rod and a sealing valve. The connecting rod has a seat and a rod body. The seat has a first surface, a second surface, an outer surface, a through hole, a groove and a retaining surface. The second surface is opposite to the first surface of the seat. The through hole is formed through the seat. The groove is defined in the outer surface of the seat. The retaining surface is defined in the seat and is adjacent to the groove of the seat. The rod body is formed on and is protruded from the second surface of the seat. The sealing valve movably engages the seat of the connecting rod and has an engaging ring and a sealing part. The engaging ring has an inwall which extends into the groove of the seat and has an engaging surface facing the retaining surface of the seat. The sealing part is connected with the inwall of the engaging ring and sealingly covers the through hole of the seat.

The piston for an air pump as described has the following advantages:

1. The sealing valve movably engages the seat of the connecting rod and the piston is convenient in assembly. Moreover, the sealing valve is not prone to deformation and warpage during the operation of the piston, and therefore the sealing part of the sealing valve covers the through hole of the seat securely to provide an excellent sealing effect. Thus, any noise problem of the elastic flap of the prior art is prevented.

2. The cover area of the sealing valve is bigger than the cover area of the elastic flap of the prior art to allow the seat of the connecting rod to seal more through holes, and then the inflation of the piston and the working efficiency of the piston are increased.

3. The material cost of the sealing valve is lower than the material cost of the elastic flap of the prior art, thus the piston for an air pump has a low cost.

Other objectives, advantages and novel features of the invention will become more apparent from the following detailed description when taken in conjunction with the accompanying drawings.

BRIEF DESCRIPTION OF THE DRAWINGS

FIG. 5 is an operational cross sectional side view of the piston for an air pump in FIG. 1 mounted in a piston cylinder and moving backward.

DETAILED DESCRIPTION OF THE PREFERRED EMBODIMENT

Figure 1:
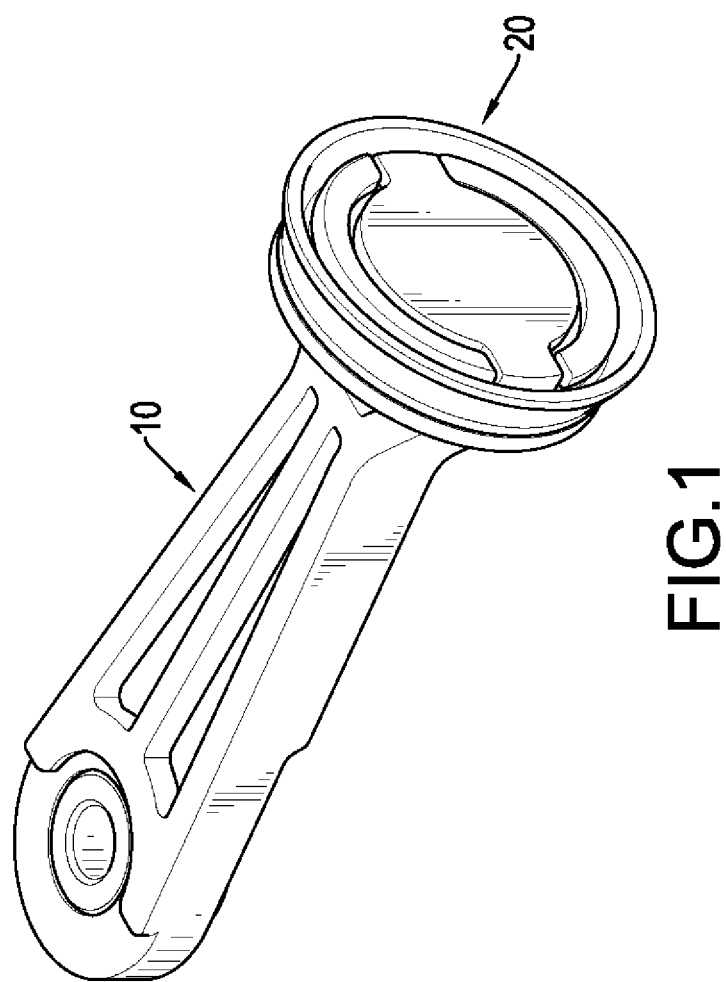
FIG. 1 is a perspective view of a piston for an air pump in accordance with the present invention.
Figure 2:
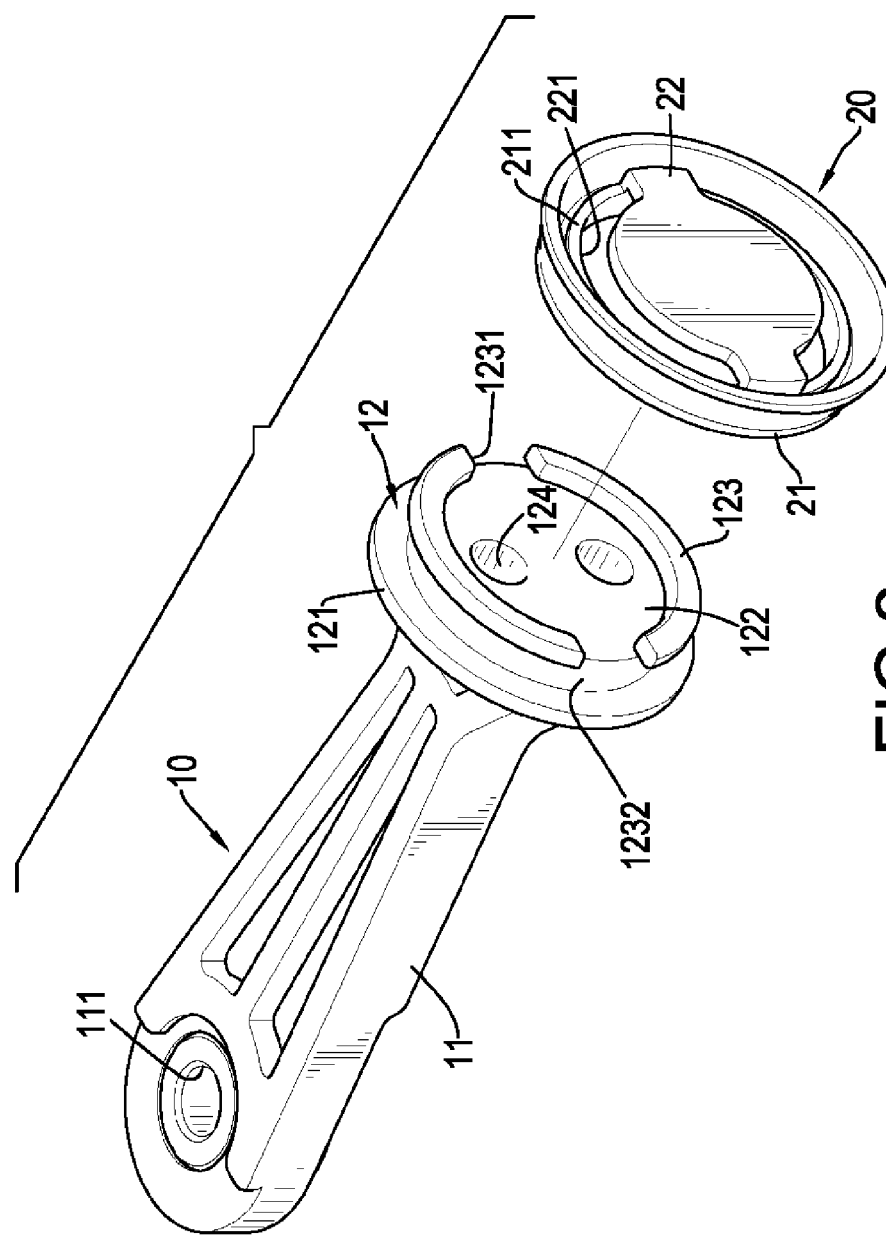
FIG. 2 is an exploded perspective view of the piston for an air pump in FIG. 1.
Figure 3:
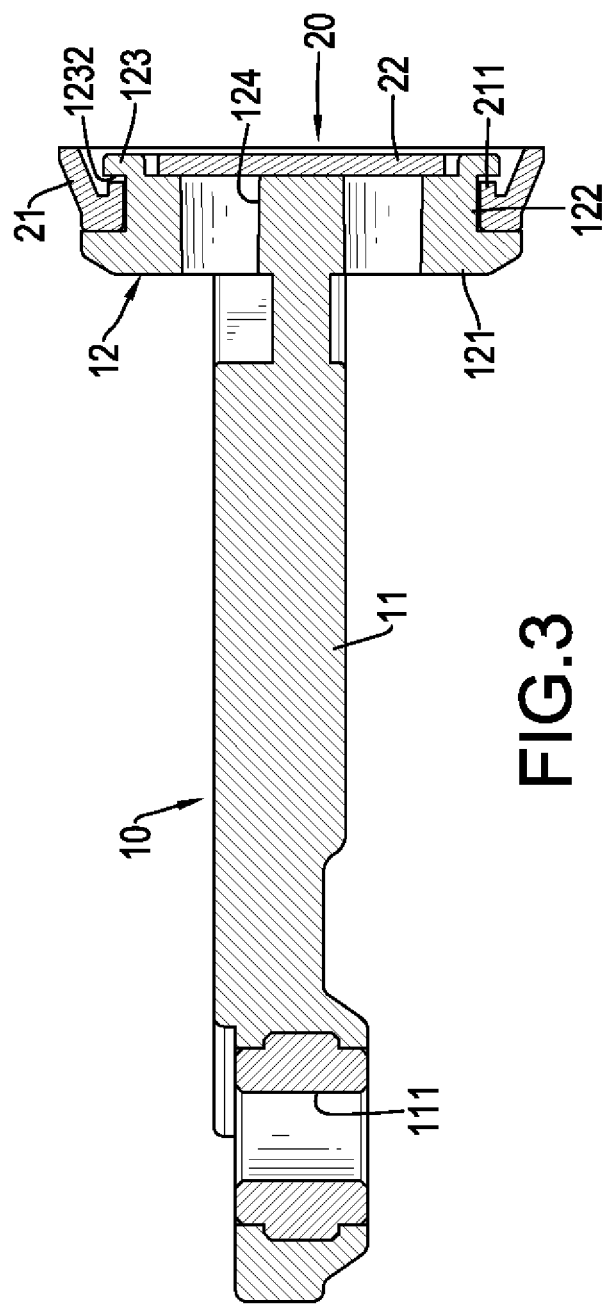
FIG. 3 is a cross sectional side view of the piston for an air pump in FIG. 1.

With reference to FIGS. 1 to 3, a piston for an air pump in accordance with the present invention comprises a connecting rod 10 and a sealing valve 20.

With reference to FIGS. 2 and 3, the connecting rod 10 has a seat 12 and a rod body 11. The seat 12 has a first surface, a second surface, a base 121, a protrusion 122, multiple engaging flanges 123, a through hole 124, a groove 1232 and a retaining surface. The second surface is opposite to the first surface. The base 121 is disc-shaped and has a connecting surface. The second surface is defined in the base 121 and is opposite to the connecting surface. The protrusion 122 is cylindrical and protrudes from the connecting surface of the base 121. The first surface is defined in a front end of the protrusion 122. The engaging flanges 123 are respectively formed on and protruding from the protrusion 122 at an edge of the protrusion 122 to form the groove 1232 defined between the base 121 and the engaging flanges 123 and around an outer surface of the seat 12. The through hole 124 is formed through the first surface and extends to the second surface. The retaining surface is defined in the engaging flanges 123 and is adjacent to the groove 1232 of the seat 12 and faces the connecting surface of the base 121. The rod body 11 is formed on and is protruded from the second surface of the seat 12 and has a connecting hole 111 to connect a driver. Furthermore, the seat 12 has multiple through holes 124 to increase the inflation of the piston. The seat 12 has two of the engaging flanges 123 and two notches 1231, and each notch 1231 is formed between the engaging flanges 123.

The sealing valve 20 movably engages the seat 12 of the connecting rod 10 and has an engaging ring 21 and a sealing part 22. The engaging ring 21 has an inwall 211. The inwall 121 extends into the groove 1232 of the seat 12 and has an engaging surface facing the retaining surface of the seat 12.

The sealing part 22 is connected with the inwall 211 of the engaging ring 21 and sealingly covers the through holes 124 of the seat 12. Furthermore, the sealing valve 20 has multiple arched holes 221 formed between the inwall 211 of the engaging ring 21 and the sealing part 22. Then, the engaging flanges 123 are respectively inserted into the arched holes 221 of the sealing valve 20. Furthermore, the sealing valve 20 is made of rubber.

Figure 4:
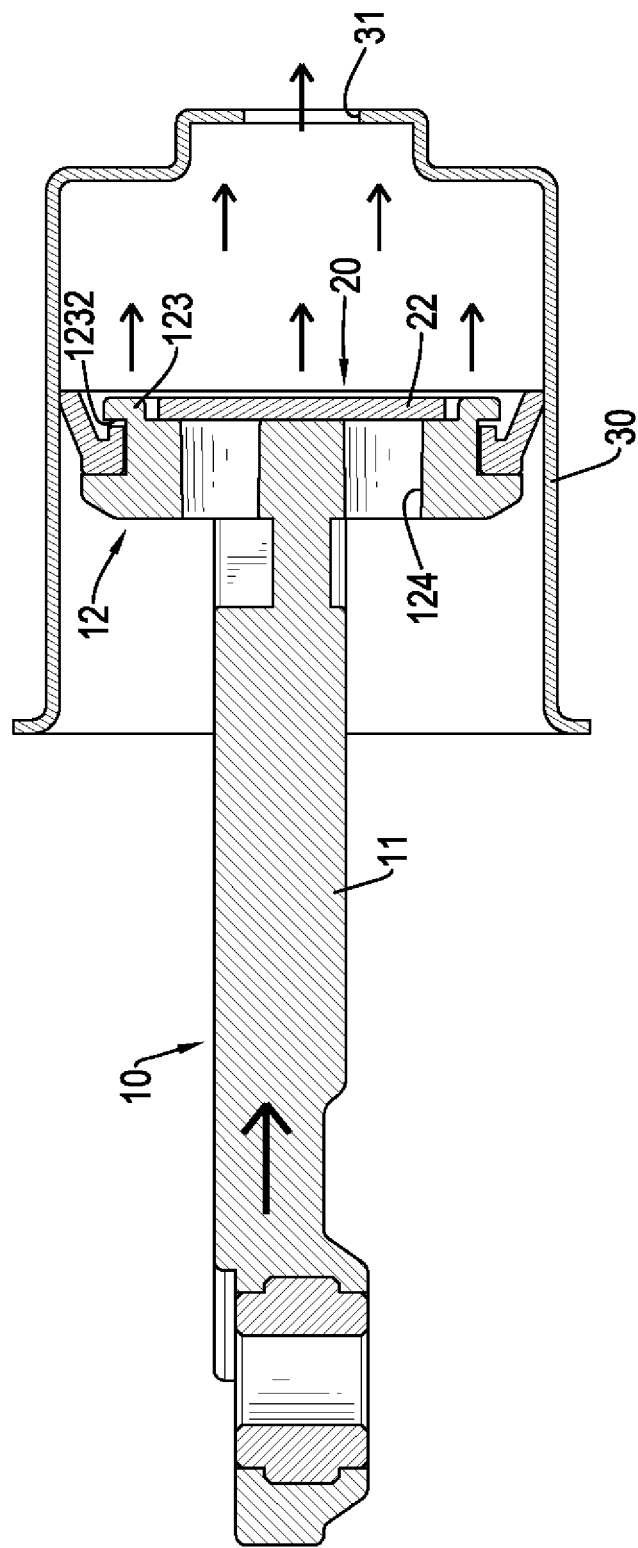
FIG. 4 is an operational cross sectional side view of the piston for an air pump in FIG. 1 mounted in a piston cylinder and moving forward.

With reference to FIGS. 4 and 5, after the piston being combined with a piston cylinder 30, the connecting rod reciprocates in the piston cylinder 30 by the driver and an outer wall of the sealing valve 20 sealingly abuts against an inner surface of the piston cylinder 30. The piston cylinder 30 has a front end, a rear end, an outlet hole 31, an opening, an inner chamber and an outer chamber. The outlet hole 31 is formed in the front end of the piston cylinder 30. The opening is formed in the rear end of the piston cylinder 30. The inner chamber is defined in the piston cylinder 30 and in communication with the outlet hole 31 and generates an inner pressure. The outer chamber is defined in the piston cylinder 30 and in communication with the opening of the piston cylinder 30 and generates an outer pressure.

With reference to FIG. 4, when the connecting rod 10 is moved forward and the seat 12 is moved forward by the connecting rod 10, the sealing valve 20 is pushed to be moved backward by the inner pressure. Thus, the sealing part 22 is sealingly covered the through holes 124 of the seat 12, and the piston can compress air in the piston cylinder 30 to flow out the outlet hole 31.

With reference to FIG. 5, when the connecting rod 10 is moved backward and the seat 12 is moved backward by the connecting rod 10, the sealing valve 20 is pushed to be moved forward by the outer pressure. Then, the engaging surface of the inwall 211 is pressed against the retaining surface of the seat 12. Therefore, a gap is formed between the sealing part 22 and the seat 12, and then the through holes 124 of the seat 12 are opened and in communication with the inner chamber of the piston cylinder 30 to allow the air to flow into the inner chamber of the piston cylinder 30.

The sealing valve 20 movably engages the seat 12 of the connecting rod 10 and the piston is convenient in assembly. The sealing valve 20 is not prone to deformation and warpage during the operation of the piston. Thus, the sealing part 22 of the sealing valve 20 covers the through holes 124 of the seat securely to provide an excellent sealing effect. Furthermore, the operating noise problem of the elastic flap of the prior art is prevented, and thus the inflation of the piston and the working efficiency of the piston are increased and the piston for an air pump has a low cost.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A piston for an air pump comprising:
    a connecting rod having
        a seat having
            a first surface;
            a second surface opposite to the first surface of the seat;
            an outer surface;
            more than one through hole formed through the seat;
            a groove defined in the outer surface of the seat; and
            a retaining surface defined in the seat and adjoined with the groove of the seat;
        a base being disc-shaped;
        a protrusion being cylindrical and protruding from the base of the seat; and
        multiple engaging flanges respectively formed on and protruding from the protrusion at an edge of the protrusion; and
    a rod body formed on and protruding from the second surface of the seat and connected with the base; and
    a sealing valve movably engaged with the seat of the connecting rod and having an engaging ring having
        an inwall extending into the groove of the seat and having an engaging surface facing the retaining surface of the seat; and
    a sealing part connected with the inwall of the engaging ring and sealingly covering the more than one through hole of the seat; and
    multiple arched holes formed between the inwall of the engaging ring and the sealing part, and the engaging flanges of the seat respectively inserted into the arched holes of the sealing valve.

2. The piston for an air pump as claimed in claim 1, wherein the groove is defined between the base and the engaging flanges.

3. The piston for an air pump as claimed in claim 1, wherein the seat has two engaging flanges and two notches, and each notch is formed between the engaging flanges.

* * * * *